United States Patent [19]
Tachibana et al.

[11] Patent Number: 5,812,283
[45] Date of Patent: Sep. 22, 1998

[54] IMAGE RECORDING APPARATUS HAVING MEMORY RELEASE MODES AFTER RECORDING OF DATA

[75] Inventors: Shunichi Tachibana, Urayasu; Hitoshi Saito, Yokohama, both of Japan

[73] Assignee: Canon Kabushiki Kaisha, Tokyo, Japan

[21] Appl. No.: 464,088

[22] Filed: Jun. 5, 1995

Related U.S. Application Data

[62] Division of Ser. No. 97,900, Jul. 28, 1993, Pat. No. 5,481,374.

[30] Foreign Application Priority Data

Jul. 28, 1992 [JP] Japan ................................. 4-201158
Jul. 9, 1993 [JP] Japan ................................. 5-170028

[51] Int. Cl.$^6$ .............................. H04N 1/40; H04N 1/00; H04N 1/32; G06F 15/00
[52] U.S. Cl. ..................... 358/444; 358/404; 358/468; 395/112; 395/113; 395/115; 395/116
[58] Field of Search .................................. 358/444, 404, 358/502, 503, 468, 437, 406; 395/112, 113, 114, 115, 116

[56] References Cited

U.S. PATENT DOCUMENTS

| | | | |
|---|---|---|---|
| 4,947,345 | 8/1990 | Paradise et al. | 364/519 |
| 5,084,831 | 1/1992 | Morikawa et al. | 395/116 |
| 5,481,374 | 1/1996 | Tachibana et al. | 358/444 |
| 5,488,407 | 1/1996 | Tachibana | 347/264 |

*Primary Examiner*—Edward L. Coles, Sr.
*Assistant Examiner*—Tia M. Harris
*Attorney, Agent, or Firm*—Fitzpatrick, Cella, Harper & Scinto

[57] ABSTRACT

Two modes for releasing a memory, a mode in which the memory is released page by page and a mode in which the memory is released block by block are provided and one of the modes is selected in accordance with the amount of received data to enhance the reliability of the reception and recording with a smaller capacity of image memory. When the reception of the data is started and the image data is filled in the memory block, the recording of the received image to a recording medium is started. Each time the recording of the memory block is completed, the release mode of the image memory is set. Namely, when the reception of the page recorded in the memory hold mode is not yet completed and the remaining capacity of the image memory reaches below a predetermined capacity, the recorded memory blocks are released and the release mode is switched to the memory release mode.

9 Claims, 9 Drawing Sheets

IMAGE RECORDING APPARATUS HAVING MEMORY RELEASE MODES AFTER RECORDING OF DATA

This application is a division of application Ser. No. 08/097,900 filed Jul. 28, 1993, now U.S. Pat. No. 5,481,374.

BACKGROUND OF THE INVENTION

1. Field of the Invention

The present invention relates to an image processing apparatus for recording an image on a recording medium in accordance with image data.

2. Related Background Art

As one of such image recording apparatus, a facsimile apparatus has been known.

In a facsimile apparatus which uses a printing unit of a lower speed than a communication speed, an image memory is usually provided to store data overflown from the recording into the memory to compensate for the lower speed. Since a capacity of the image memory is definite, it is necessary to erase the recorded image data to release the memory.

A timing to release the image memory is critical. Where a system in which one page of memory area is released when one page of recording is completed (hereinafter a memory hold mode) is adopted, it is not possible to receive a document having larger information amount than the image memory capacity. In order to solve the problem, an image memory having a sufficiently large capacity may be provided but it raises a cost problem. Where a system in which the memory area is released when the recording of a memory block having a size of one line to any number of lines is completed (hereinafter a memory release mode) is adopted, there is a risk that the image may be erased without being properly recorded if there is an error in the recording of a page such as a jam of a sheet.

SUMMARY OF THE INVENTION

It is an object of the present invention to provide an improved image recording apparatus.

It is another object of the present invention to provide an image recording apparatus which enhances the reliability of recording received record without using a large capacity memory.

It is still another object of the present invention to provide an image recording apparatus which changes a release mode of an image memory in accordance with a remaining capacity of the image memory.

It is still another object of the present invention to provide an image recording apparatus which selects one of a system in which the memory is released page by page and a system in which the memory is released block by block, in accordance with the remaining capacity of the memory.

The above and other objects of the present invention will be apparent from the accompanying drawings and the following description of the invention.

DETAILED DESCRIPTION OF THE PREFERRED EMBODIMENTS

Preferred embodiments of the present invention are now explained with reference to the accompanying drawings.

Figure 1:
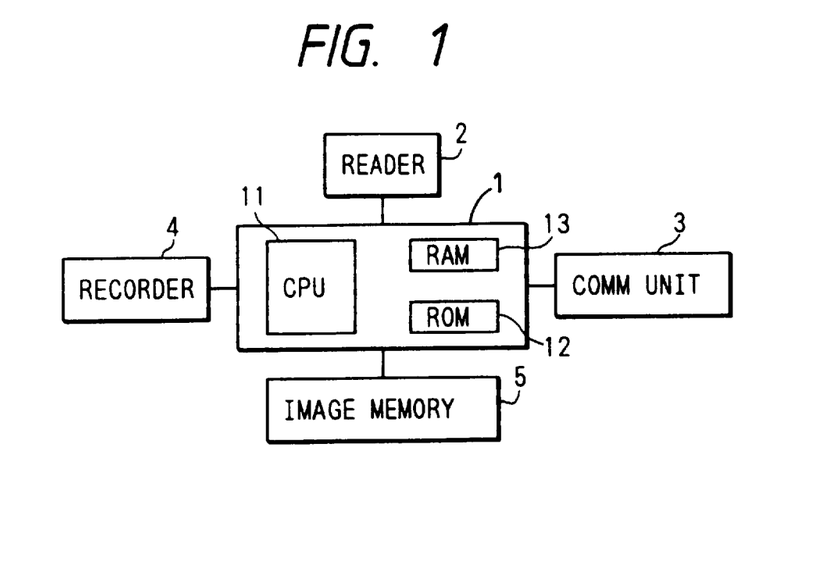
FIG. 1 shows a block diagram of a configuration of a facsimile apparatus in an embodiment.

FIG. 1 shows a block diagram of a facsimile apparatus in one embodiment of the present invention. In FIG. 1, numeral 1 denotes a control unit for controlling the entire apparatus. The control unit 1 has a CPU 11, a ROM 12 and a RAM 13. The CPU 11 controls the facsimile apparatus in accordance with various control programs stored in the ROM 12. Control programs for executing the controls by the CPU 11 are stored in the ROM 12. The RAM 13 is a temporary storage area when the CPU 11 executes the processing and stores various management tables (block management table, page management table and file management table).

Numeral 2 denotes a reader which reads an image of a document sheet. Numeral 3 denotes a communication unit which includes a modem circuit and a network control circuit, and exchanges data with other facsimile apparatus connected to the line. Numeral 4 denotes a recording unit which records an image on a recording paper by ejecting ink, in accordance with received image data. Numeral 5 denotes an image memory for storing image data.

Figure 2:
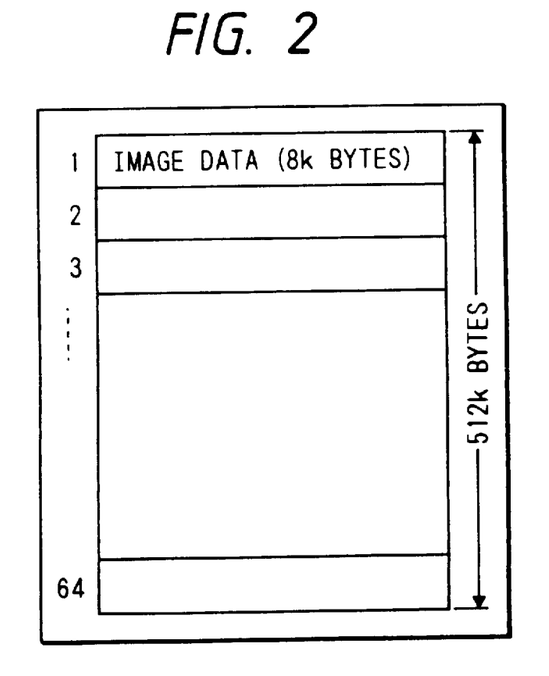
FIG. 2 shows a data format of an image memory in the embodiment.

FIG. 2 shows a data format of the image memory 5. As shown in FIG. 2, the image memory has a total capacity of 512K bytes and it is managed by memory blocks each having 8K bytes. Accordingly, the total number of memory blocks is 64.

Figure 3:
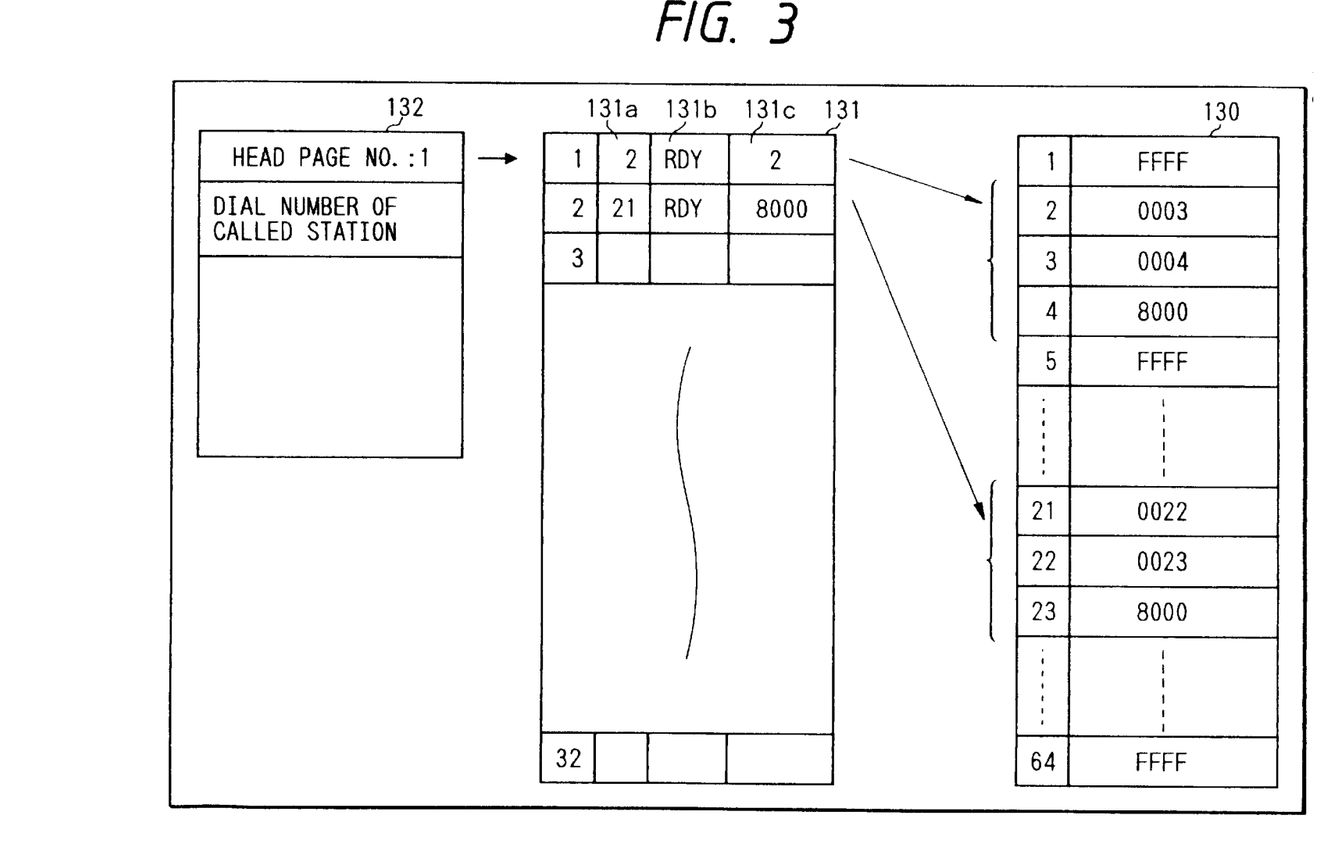
FIG. 3 shows various management tables in a RAM.

FIG. 3 shows various management tables in the RAM 13. A memory block management table 130 manages the memory blocks of the image memory 5 and comprises 64 words one for each of the memory blocks. When the memory block is not used, FFFFH is written in the corresponding area (word) of the memory block management table to represent non-use. Accordingly, when the memory block is to be used, a vacant block having FFFFH written therein is searched on the memory block management table 130. Where an image whose one page of image data is not stored in one block is to be stored, the next block number is written in the block management table to indicate the serial use. In the last block of the page, 8000H is written to indicate that there is no next block.

In FIG. 3, a memory block "1" is non-use and a memory block "2" is in-use. The image data stored in the memory block "2" is not fully stored in one block but data is serially stored in memory blocks "3" and "4". The data ends at the memory block "4".

Similarly, a page management table 131 is provided for page management. A head block number of the image, a status of the image and a next page number are written in the page management table 131. In the present embodiment, a 32-page record is stored in the page management table 131 so that it can manage up to 32 pages. A head block number 131a represents a head block number of the image of that page. Whether the page is busy or not is written in a status 131b. It is busy during the preparation of the page and ready after the preparation. If there is the next page, the number thereof is written in the next page number 131c, and if it is the last page, 8000H is written.

A file management table 132 for managing the files is provided. A table number of a head page of the file and a destination telephone number for transmission (or a dial number of a called station) are written in the file management table.

Figure 4:
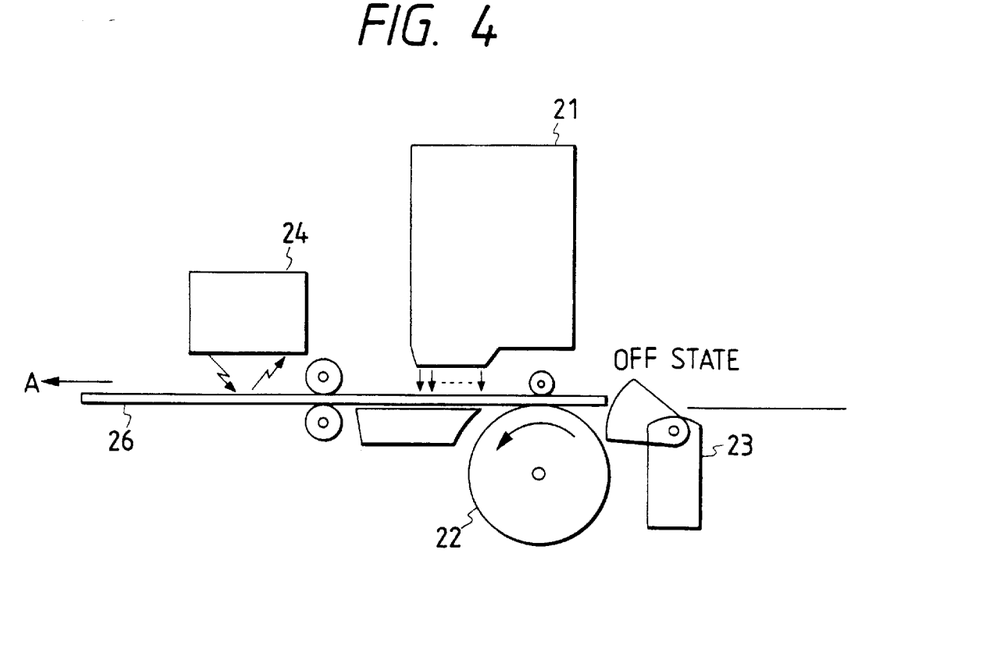
FIG. 4 shows a configuration of a recording unit of the facsimile apparatus in the embodiment.

FIG. 4 shows a configuration of the recording unit 4 of the present embodiment.

Figure 5:
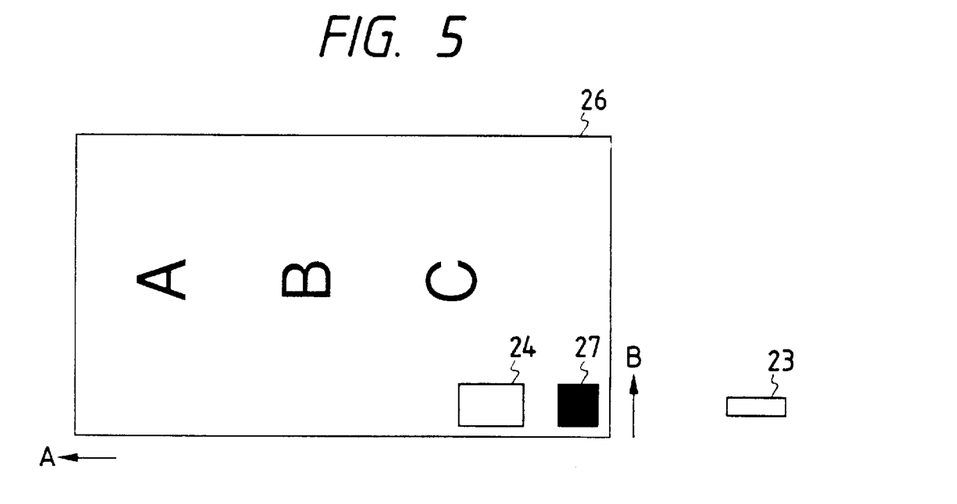
FIG. 5 shows a positional relation between a recording sheet sensor and a photo-sensor.

Numeral 21 denotes a recording head which has nozzles of a 64-dots line having a recording density of 360 dpi in a direction of sub-scan (an arrow A) and it records at a recording density of 360 dpi ×360 dpi while it is driven at a recording density of 360 dpi in a main scan direction (normal to the plane of the drawing, an arrow B in FIG. 5). In the present embodiment, the recording head has a heater for each nozzle and causes a status change in ink by using thermal energy generated by the heater to discharge an ink droplet. Numeral 22 denotes a recording sheet transport unit which transports the recording sheet at a precision of 360 dpi to determine a position in the sub-scan direction when the recording sheet is fed, ejected and the data is recorded by the recording head 21. Numeral 23 denotes a recording sheet sensor which is ON when the recording sheet is present at a detection position of the sensor and OFF when it is absent. The presence or absence of the recording sheet and a leading edge and a trailing edge of the recording sheet are detected by the recording sheet sensor 23. Numeral 24 denotes a reflection type photo-sensor which detects an image density on a recording plane of the recording sheet. A record control unit (not shown) controls the recording head 21, the recording sheet transport unit 22 and the recording sheet sensor 23 in accordance with the control data sent from the CPU 11. Numeral 26 denote a cut sheet on which the image is to be recorded.

FIG. 5 shows a positional relation between the recording sheet sensor 23 and the photo-sensor 24. Numeral 27 denotes a footer mark to be explained later and a recording position thereof. The sensors 23, 24 and the footer mark 27 are arranged to align on a straight line in the direction of the transport of the recording sheet (direction A or the sub-scan direction). They are located at a leftmost end of a recordable range of the recording head 21 to the cut sheet 26.

Receiving and recording operations of the facsimile apparatus of the present embodiment are now explained.

Figure 6:
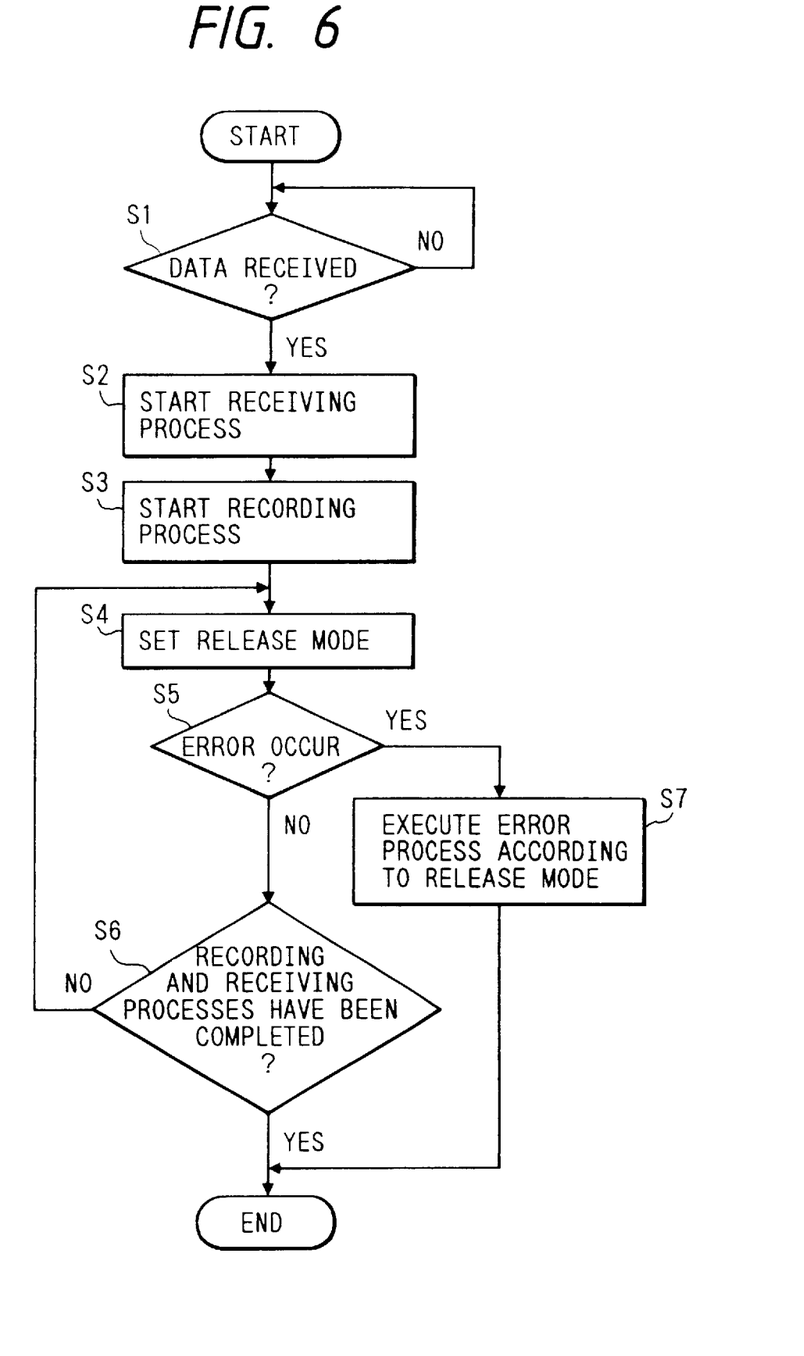
FIG. 6 shows a flow chart of receiving and recording operations of the facsimile apparatus of the embodiment.

FIG. 6 shows a flow chart of the receiving and recording operations of the facsimile apparatus. In a step S1, the reception of an image data is monitored. When the image data is received, the process proceeds to a step S2 to start a reception process (see a flow chart of FIG. 7). Following to the reception process, a recording process (see a flow chart of FIG. 8) is started in a step S3. In this manner, the reception process and the recording process are executed in parallel. During the execution of the recording process, a release mode is set in a step S4 (see a flow chart of FIG. 9). In the facsimile apparatus of the present embodiment, two release modes, a serial release mode (memory release mode) in which a block memory is release each time the recording of one block of memory is completed and a page release mode (memory hold mode) in which all memory blocks for a page image are released when one-page recording is completed are provided as the release modes for the image memory. In the step S4, one of the two release modes is selected in accordance with the remaining capacity of the image memory.

In a step S5, whether an error has occurred during the recording process or not is determined. If an error has occurred, the process proceeds to a step S7 and an error process is executed in accordance with the release mode. When the occurrence of the error is detected, an interruption signal may be generated to start the error process. In a step S6, whether the reception process and the recording process have been completed or not is determined. If they are not completed yet, the process returns to the step S4 and the above steps are repeated. If they are completed, the process is terminated.

Figure 7:
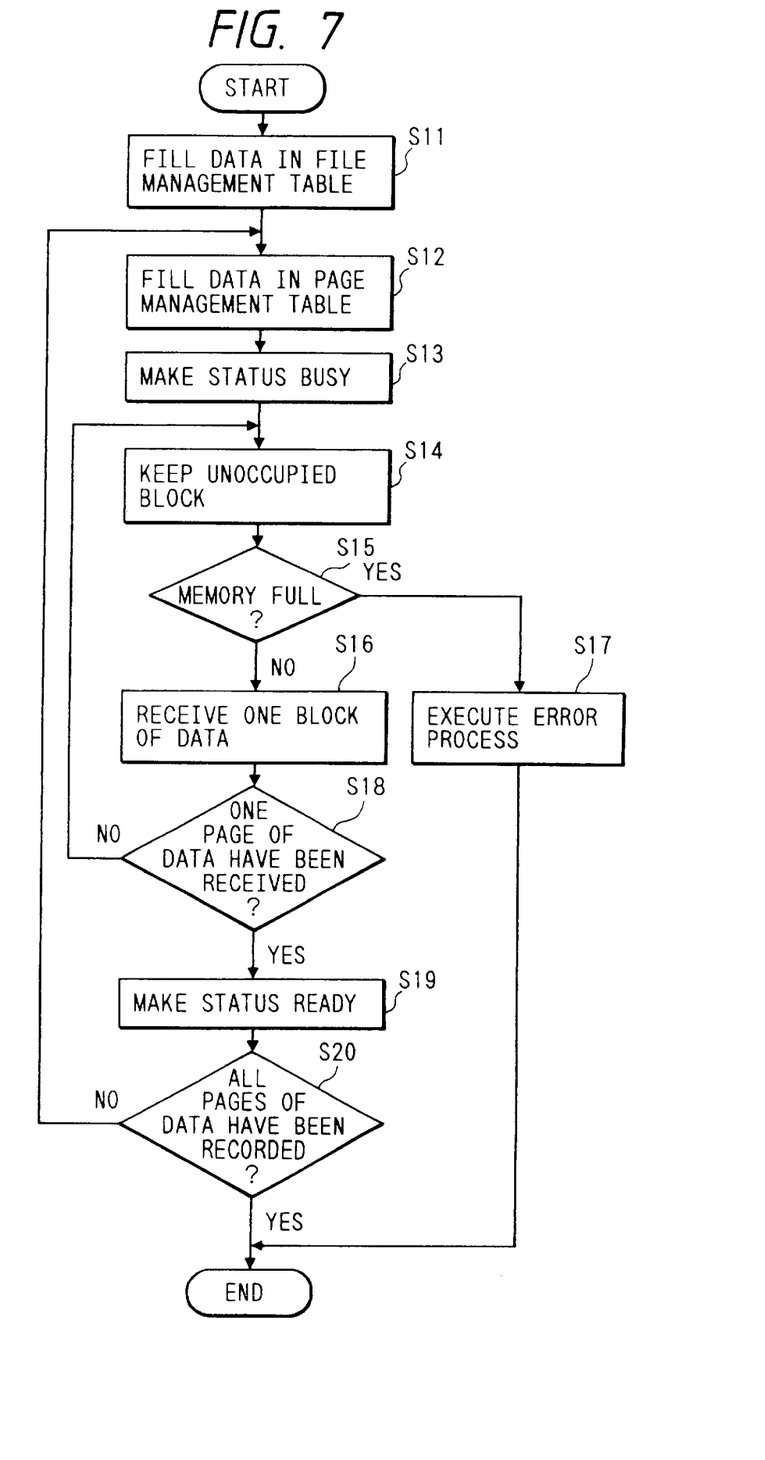
FIG. 7 shows a flow chart of a control process in the receiving process.

The reception process is explained in further detail. FIG. 7 shows a flow chart of a control process of the reception process in the present embodiment.

In the reception process, management information of a file to store the received image is first prepared in a step S11. In a step S12, page management information is prepared. They are written into the file management table 132 and the page management table 131, respectively. In a step S13, the status 131b of the page management table 131 is set to busy and the reception of one page is started.

In a step S14, one memory block of the image memory 5 is secured. A vacant memory block having FFFFH written in the block management table 130 is searched and it is used. If there is no vacant block by a decision in a step S15, the process proceeds to a step S17 and the process terminates in error because the image memory 5 is full and cannot receive the data. If a vacant memory block is found, one memory block of data is received in a step S16, and the completion of the reception of one page of data is checked in a step S18. This is conducted by checking whether RTC (six continued EOL patterns) is included in the received data. If the RTC is not included, it means that the reception of one page of data has not yet been completed and the process returns to the step S14 to continue the reception. If the RTC is detected, the process proceeds to a step S19 to render the status 131b of the page management record 131 to ready and the reception of one page of data is terminated. If the next page follows, the process returns to the step S12 to continue the communication, and if it is the last page, the communication is terminated.

Figure 8:
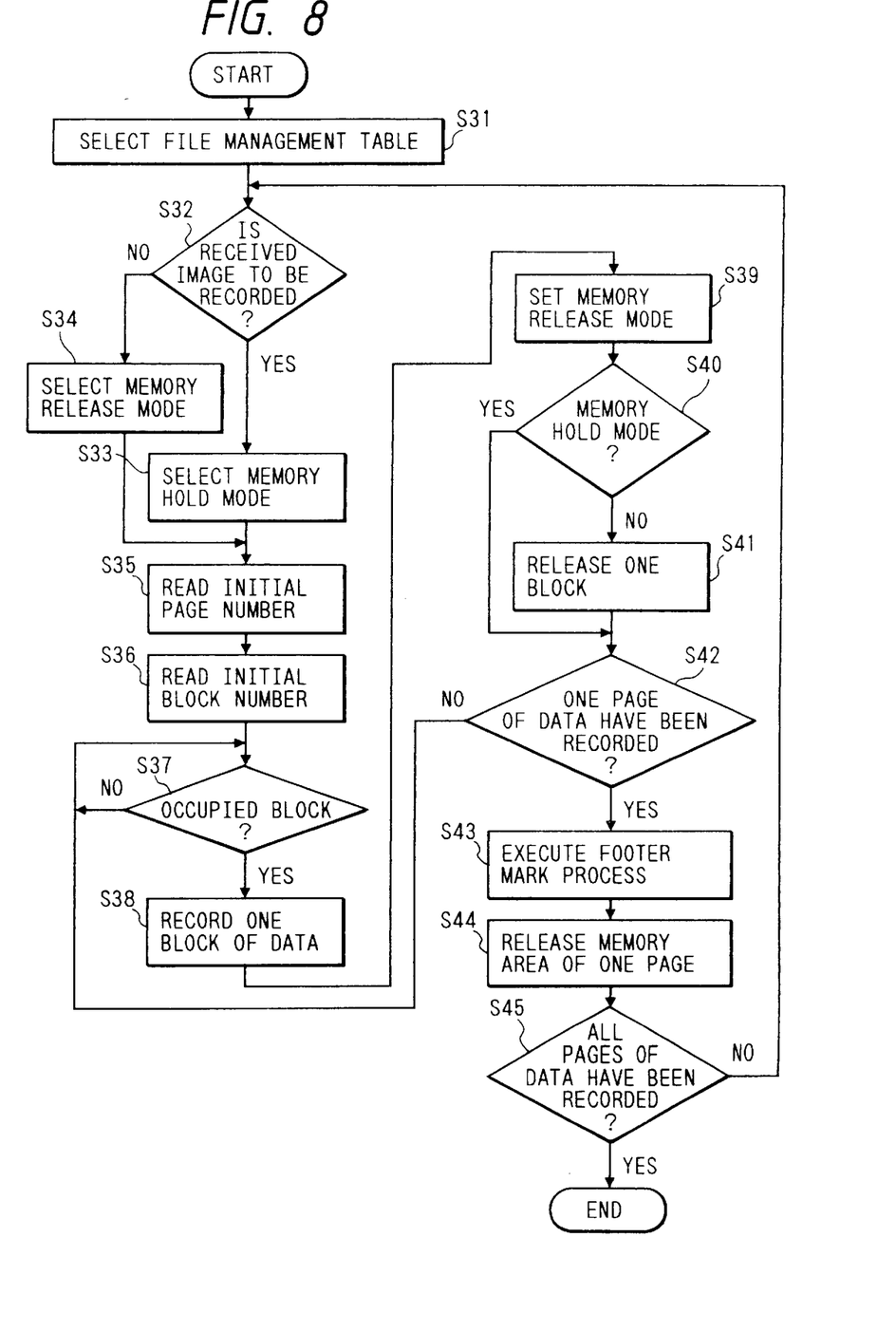
FIG. 8 shows a flow chart of a control process of the recording process.

The recording process is now explained. FIG. 8 shows a flow chart of a control process of the recording process of the present embodiment. It is executed by the CPU 11 in parallel with the reception process shown in FIG. 7.

In a step S31, a file management table of a file in which the receding is to be made is selected. In the recording process, the memory hold mode in which the memory is held until the recording of one page is completed and the serial release mode in which the recorded memory blocks are serially released are used as the release modes of the image memory. In a step S32, whether the image to be recorded is the received image or not is determined. If it is the received image, the memory hold mode is selected (step S33), and if it is an image of a report or a copy sheet, the memory release mode is selected (step S34).

In a step S35, a table number of a head page is read from the file management table 132. Then, a first block number of the page is read from the page management table 131. The corresponding table number of the block management table 130 is looked up to determine whether the memory block has been occupied or not (step S37). In the present embodiment, if the memory block has been occupied, the next block number or 8000H indicating the last number should have been written, and if it has not been occupied, FFFFH should have been written. If the memory block is FFFFH (that is, it has not been occupied), the process returns to the step S37 and waits until the number other than FFFFH is written. If the memory block is occupied, the process proceeds to a step S38 to conduct the recording operation for one memory block of image data.

When the recording is completed, the release mode of the image memory is set in a step S39 in accordance with the relation between the image memory and the received data. The setting process of the release mode of the image memory in the step S39 will be explained later with reference to a flow chart of FIG. 9. In a step S40, whether the current release mode of the image memory is the memory release mode or the memory hold mode is determined. If it is the memory release mode, the recorded block is released in a step S41 and the process proceeds to a step S42. If it is the memory hold mode, the process proceeds to the step S42. In the step S42, whether one page of recording has been completed or not is determined by whether the recorded memory block is the last block or not, and if it is not yet completed, the process returns to the step S37 to repeat the above steps. On the other hand, if one page of recording has been completed, the process proceeds to a step S43 to conduct a footer mark process. The footer mark process will be explained later with reference to a flow chart of FIG. 10.

In a step S44, one page of image memory is released. In actual, it is conducted by the following process. FFFFH is written to all memory blocks used by the page in the memory block management table 130 and the table of that page of the page management table 131 is cleared. The next page number is written in a column of the head page number of the file management table 132. Through those processes, the recorded page is completely erased. In a step S45, whether the recorded page is the last page or not is determined. If it is not the last page, the process returns to the step S32 to record the next page. On the other hand, if the recording to the last page has been completed, the process is terminated.

Figure 9:
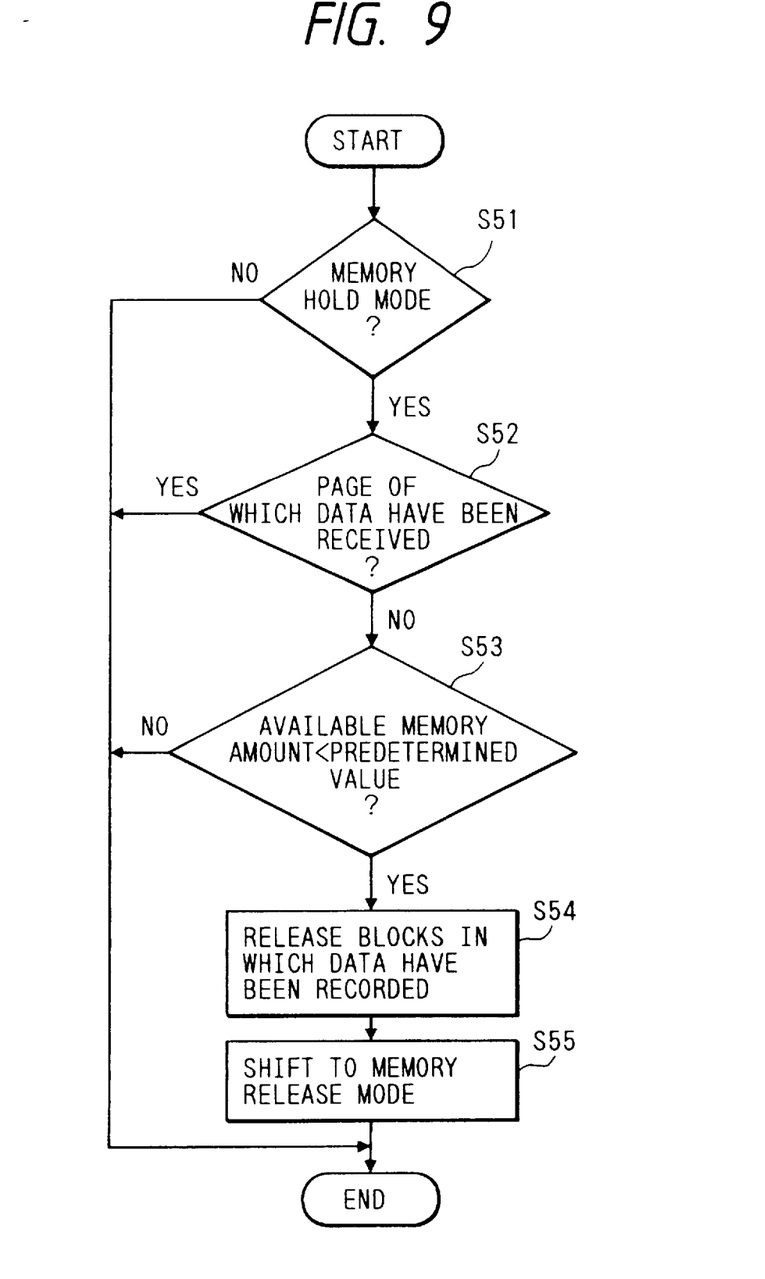
FIG. 9 shows a flow chart of a process for setting a release mode of the image memory.

The set process of the release mode of the image memory is now explained. FIG. 9 shows a flow chart of the set process of the release mode of the image memory.

In a step S51, whether the current memory release mode is the memory hold mode or not is determined. If it is the memory hold mode, the status 131b of the page is checked in a step S52. If the status 131b is ready, it means that the reception has been completed for that page and the process is terminated without changing the image memory release mode. On the other hand, if the status 131b is busy, the process proceeds to a step S53 to check the remaining capacity of the image memory 5. If the remaining capacity is smaller than a predetermined capacity, the process proceeds to a step S54.

In the present embodiment, the predetermined capacity is 128K bytes which corresponds to ¼ of the total memory capacity. It corresponds to 16 memory blocks and the number of vacant blocks of the memory block management table 130 is counted and shortage of the remaining capacity is determined if the count is no larger than 16. If the remaining capacity is short, the recorded blocks of the memory are released in a step S54. The memory blocks from the head memory block of the page being recorded to the memory block just recorded are released and FFFFH is written in the corresponding table of the memory block management table 130. Then, the block number of the memory block to be next recorded is written in the column of the head block number 131a of the page management table 131. In a step S55, the mode is shifted to the memory release mode and the process is terminated.

On the other hand, in the step S51, if the image memory release mode is the memory release mode, the process is terminated.

Figure 10:
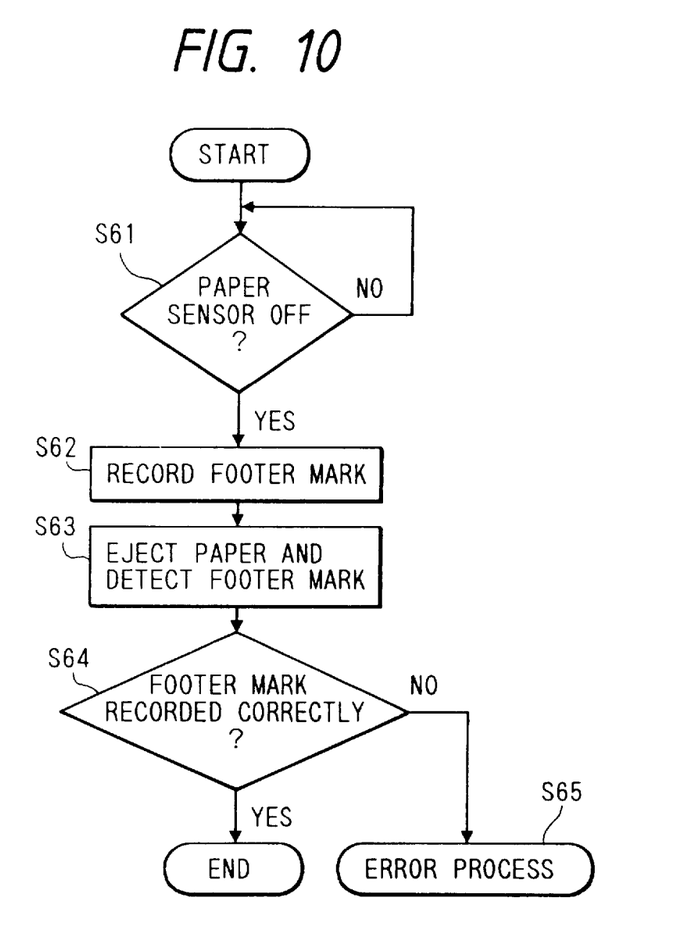
FIG. 10 shows a flow chart of a control process of footer mark processing.

The footer mark process to record and detect the footer mark is now explained. FIG. 10 shows a flow chart of the control process of the footer mark process.

During the recording on the recording sheet 16, the OFF state of the recording sheet sensor 13 is checked. If it is OFF (the trailing edge of the recording sheet is detected), the process proceeds to a step S62. In the step S62, the footer mark is recorded. In a step S63, the density of the recording sheet 16 at the position of the footer mark 17 is detected by the photo-sensor 14 while the recording sheet 16 is ejected. In a step S64, whether the footer mark has been properly recorded or not is determined and if it is properly recorded the process is terminated. If the footer mark is not detected by the non-discharge of ink, a record error signal is produced to start an error process in a step S65.

Figure 11:
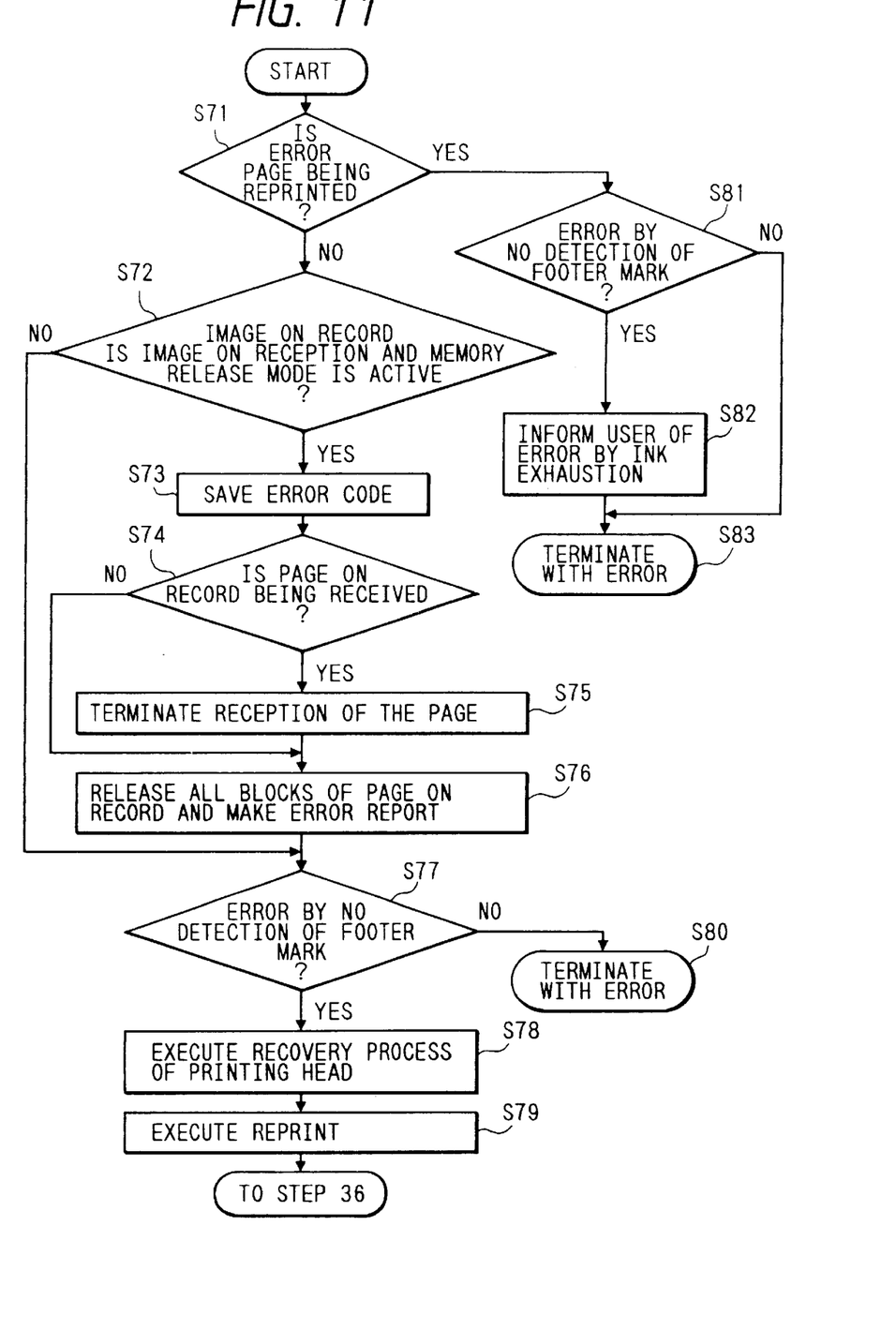
FIG. 11 shows a flow chart of a control process of an error process when an error occurs during the recording process.

The error process is now explained. FIG. 11 shows a flow chart of the control process of the error process when an error occurs during the recording process.

In the error process of the present embodiment, a special process is executed when a footer mark detection error occurs. Even if ink remains in an ink cartridge, the ink may not be discharged (bubble non-discharge) because a large bubble is generated in an ink nozzle. This causes a footer mark detection error. In this case, the ink nozzle is sucked by a pump to recover it so that it may print again. In the error process of the present embodiment, when the absence of the footer mark is detected, the automatic recovery is conducted and the image is recorded once more and the footer is detected. If the absence of footer is still detected, it is determined that the ink is exhausted and "exchange cartridge" is indicated. Thus, if the footer mark is not detected and it is not due to the bubble non-discharge but due to the ink exhaust, one sheet is ejected but the ejected sheet may be reused by setting it in the apparatus and there is no waste of sheet.

In an error such as ink exhaust occurs in the printer during the reception in the memory release mode and the received image cannot be recorded, the received image cannot be printed out again because the received image has been erased from the memory. This is called a reception record error.

In a step S71, if the page in which the error has occurred is a page which is being automatically reprinted, the process proceeds to a step S80, and if it is not the page which is being automatically reprinted, the process proceeds to a step S72. In the step S72, if the image under recording is the received image and the mode is the memory release mode, the process proceeds to a step S73, and if not, the process proceeds to a step S77.

In the step S73, an error code indicating the reception record error which represents that the reception is in error because of an error in the recording is saved. In a step S74, if the reception of the page including the page under recording is in progress, the reception is forcibly terminated (step S75). In this manner, when the record error occurs during the reception of the page under recording, the line is disconnected and the transmission is terminated by error in that page. When an error occurs during the reception of the next or subsequent page to the page under recording, the error page number in the transmission station staggers but the corresponding communication is terminated by error.

In the step S74, if the reception of the page including the page under recording has been completed, an acknowledgement has been sent to the transmission station and the corresponding communication has been terminated in the transmission station.

In any event, the image data of the page in which the reception record error occurred during the reception in the memory release mode is not left in the image memory. As a result, it is not possible for the user to release the error and print it out again. Accordingly, a reception record error report is prepared in the page management table in which the error has occurred, instead of the received image and it is held in the memory until it is normally printed out. Namely, in a step S76, all memory blocks of the page under recording are released and the reception record error report is prepared in the page management table.

The reception record error report may be a message of "Not received. Contact to destination station to resend it." To countermeasure to the bubble non-discharge, the footer is printed in the reception record error report.

In a step S77, a cause of the record error is checked. If it is a footer non-detection error, the process proceeds to a step S78 to recover the recording head. In a step S79, the record page is selected to the same page and the process proceeds to the step S36 of FIG. 8 to conduct the automatic reprinting. The reception record error report is also printed by the automatic reprinting. In the step S77, if the cause is other than the footer mark non-detection error, the process proceeds to a step S80 and the process terminates by error.

On the other hand, if it is reprint in the step S71, the process proceeds to a step S81, and if it is the again footer mark non-detection error, it is determined as the ink exhaust error and it is informed to the user in a step S82. The current page and the image data subsequently sent are stored and saved in the image memory 5. In a step S83, the process is terminated by error.

In accordance with the facsimile apparatus of the present embodiment, the memory hold mode in which the memory is released page by page and the memory release mode in which the memory is released block by block can be selected in accordance with the situation. Namely, normally one page of memory is released at the completion of one page of recording, and if the remaining capacity of the memory is smaller than the predetermined capacity in the recording of the page under reception, the memory is released block by block. For the page for which the reception has been completed, the acknowledge signal for that page has been sent to the transmission station. Accordingly, the memory hold mode is selected to secure the output. If the record is in error, the image is retained to permit the outputting thereof after the removal of the cause of the error. On the other hand, if the recording is for the page under reception and the remaining memory capacity is short, the memory will overflow if the reception is continued and an error will occur. Thus, the memory release mode to release the recorded memory blocks is selected to reduce a risk of communication disability due to the memory overflow.

In accordance with the facsimile apparatus of the present embodiment, if the record error occurs in the recording process in the memory release mode and if the communication including the page under recording is still in progress when the record error occurs, the line is immediately disconnected to inform to the transmission station that the data was not received.

In the facsimile apparatus of the present embodiment, the remaining ink amount detection means by the footer is provided in which the ink jet printer is built in the recording head, the footer mark is recorded at the trailing edge of the recording sheet, and the mark is detected by the sensor to detect the ink exhaust during the recording of the page. The footer detection is not conducted during the output of the normal management report or copy image and the ink remaining amount detection is conducted for the received image and the communication result report so that the reception record error report is surely outputted when the acknowledgement has been sent to the destination in spite of the failure of reception by the ink exhaust.

In accordance with the facsimile apparatus of the present embodiment, if the footer mark detection error occurs during the recording in the memory serial release mode, the recovery is automatically made so that the report to inform the failure of the reception to the user is more surely outputted.

Since the reliability of the reception record of the printer unit is enhanced, the reception with a small capacity of image memory is attained even when a low speed printer is used as the recording unit of the facsimile apparatus and the cost of the apparatus is reduced.

The present invention may be applied to either a system comprising a plurality of equipments or a system comprising a single equipment. The present invention is also applicable to a combination of the system and a program.

The present invention is also applicable to a facsimile apparatus which uses an ink jet recording system such as a so-called piezo type ink jet recorder using a piezo-electric element as an energy source to discharge ink as a recording unit. High density recording and fine recording are attained particularly when the present invention is applied to a recording head and recording apparatus in which status change in ink is caused by thermal energy and the ink is discharged from a discharge port by the status change.

A typical configuration thereof and a principle are disclosed in U.S. Pat. No. 4,723,129 and U.S. Pat. No. 4,740,796. The present system is applicable to either an on-demand type or a continuous type. In the on-demand type, at least one drive signal which causes a rapid temperature rise over a nuclear boiling point in accordance with recording information is applied to electro-thermal converters arranged on sheets by which liquid (ink) is held in order to generate the thermal energy in the electro-thermal converters to cause film boiling on a thermal acting plane of a recording head. As a result, bubbles of liquid (ink) which directly correspond to the drive signal are formed. To form the bubbles, the liquid (ink) is discharged by contraction through the discharging port to form at least one droplet. When the drive signal is a pulse signal, the formation and the contraction of the bubble can be attained instantly and properly and highly responsible discharge of liquid (ink) is attained. The drive by the pulse signal is disclosed in U.S. Pat. No. 4,463,359 and U.S. Pat. No. 4,345,262. When a condition disclosed in U.S. Pat. No. 4,313,124 relating to a temperature rise factor on the thermal acting plane is adopted, better recording can be attained.

The recording head may be a combination of discharge ports, a liquid path and electro-thermal converters (linear liquid flow path or orthogonal liquid flow path) disclosed in the above patents, or a construction shown in U.S. Pat. No.

4,558,333 or U.S. Pat. No. 4,459,600 which discloses to arrange the thermal acting portion in a curved area. Further, it may be a construction as disclosed in Japanese Laid-Open Patent Application No. 59-123670 in which a common slit to a plurality of electro-thermal converters is used as a discharge portion of the electro-thermal converters or Japanese Laid-Open Patent Application No. 59-138461 in which an aperture for absorbing a pressure wave of thermal energy is formed for the discharge portion. Whatever the construction of the recording head is, the recording can be attained in the efficient manner.

The present invention is also applicable to a full line type recording head having a length equal to a maximum width of a recording medium on which the recording apparatus can print. Such a recording head may meet the length requirement by a combination of a plurality of recording heads or a single integral recording head. In a serial type recording head, the present invention is also applicable if an exchangeable chip type recording head which permits electrical connection with a main unit and supply of ink from the main unit when it is mounted on the main unit, or a cartridge type recording head is used.

It is preferable to add auxiliary means to the recording head used in the recording unit of the present invention to further stabilize the effects of the present invention. For example, preliminary heating means by an electro-thermal converter or other heating element or a combination thereof may be provided to attain stable recording.

The type and the number of the recording heads mounted may be one for monochromatic ink or plural for a plurality of inks of different colors or densities.

What is claimed is:

1. An image communication apparatus comprising:

communication means for communicating image data with a partner station;

memory means for storing image data to be recorded wherein said memory means is capable of storing image data corresponding to a report on a communication by said communication means and received image data transmitted from the partner station;

recording means for recording an image on a recording medium in accordance with the image data stored in said memory means;

setting means for setting an operation mode of said memory means to either a first mode or a second mode in accordance with a sort of image data to be recorded, wherein in the first mode, a memory area of said memory means in which a page of image data is stored is released after the completion of the recording of a page of image data, and in the second mode a memory area of said memory means in which a predetermined amount of image data is stored is released after the completion of the recording of the predetermined amount of image data during the recording of the page of image data, and wherein said setting means sets the first mode when the image data to be recorded is the received image data, and sets the second mode when the image data to be recorded is the image data corresponding to the communication report.

2. An image recording apparatus according to claim 1, wherein said setting means switches the operation mode of said memory means, when the first mode has been set, from the first mode to the second mode in accordance with a remaining capacity of said memory means.

3. An image recording apparatus according to claim 1, further comprising driving means for moving said recording means in a main scanning direction relatively with respect to the recording medium, and transport means for transporting the recording medium in a subscanning direction, different from the main scanning direction, in compliance with a relative movement of said recording means by said driving means.

4. An image recording apparatus according to claim 1, wherein said recording means records an image on the recording medium through ejecting an ink droplet in accordance with the image data.

5. An image recording apparatus according to claim 3, wherein said recording means records an image on the recording medium through ejecting an ink droplet in accordance with the image data.

6. An image recording apparatus according to claim 4, wherein said recording means discharges the ink droplet by causing a status change in the ink by using thermal energy.

7. An image recording apparatus according to claim 5, wherein said recording means discharges the ink droplet by causing a status change in the ink by using thermal energy.

8. An image recording apparatus according to claim 2, wherein said recording means records an image on the recording medium through ejecting an ink droplet in accordance with the image data.

9. An image recording apparatus according to claim 8, wherein said recording means discharges the ink droplet by causing a status change in the ink by using thermal energy.

* * * * *

UNITED STATES PATENT AND TRADEMARK OFFICE
CERTIFICATE OF CORRECTION

PATENT NO. : 5,812,283

DATED : September 22, 1998

INVENTOR(S): SHUNICHI TACHIBANA ET AL.   Page 1 of 2

It is certified that error appears in the above-identified patent and that said Letters Patent is hereby corrected as shown below:

COLUMN 1

Line 5, "08/097/,900" should read --08/097,900--.

COLUMN 3

Line 42, "denote" should read --denotes--;
Line 67, "release" should read --released--.

COLUMN 4

Line 54, "receding" should read --recording--.

COLUMN 5

Line 33, "actual," should read --actuality,--.

COLUMN 6

Line 47, "In" should read --If--.

COLUMN 7

Line 36, "reprint" should read --reprinted--.

UNITED STATES PATENT AND TRADEMARK OFFICE
CERTIFICATE OF CORRECTION

PATENT NO. : 5,812,283

DATED : September 22, 1998

INVENTOR(S): SHUNICHI TACHIBANA ET AL.

It is certified that error appears in the above-identified patent and that said Letters Patent is hereby corrected as shown below:

COLUMN 8

Line 47, "nuclear" should read --nucleate--.

Signed and Sealed this

Eighth Day of June, 1999

*Attest:*

Q. TODD DICKINSON

*Attesting Officer*     *Acting Commissioner of Patents and Trademarks*